DAVID J. SHEERS.
Corn-Marker.

No. 121,012.    Patented Nov. 14, 1871.

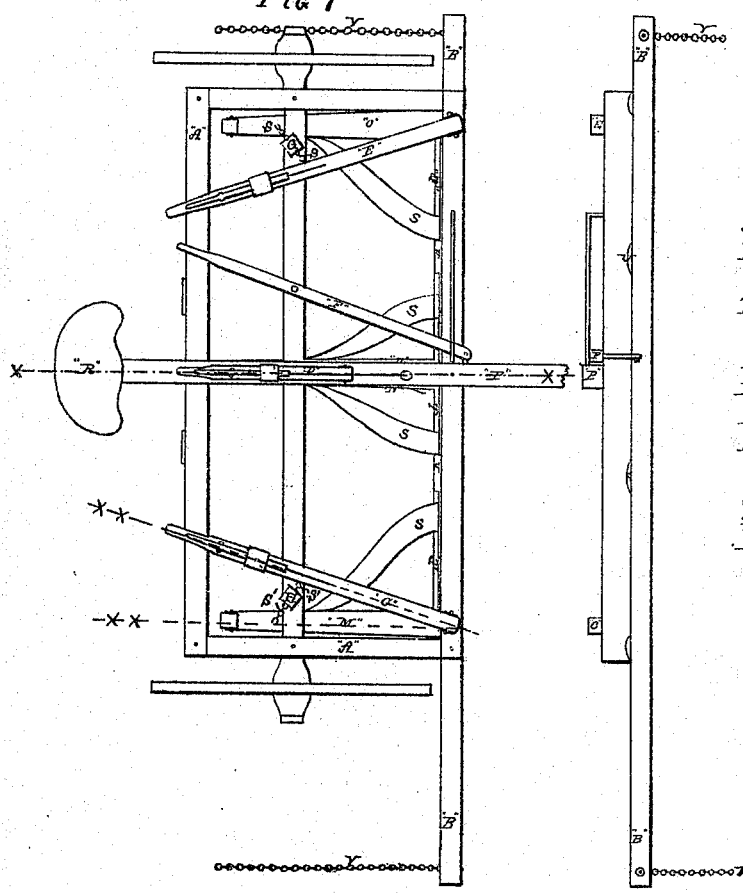

Description

A — Frame of Machine
B — Slide-guage for guiding the Machine
C D E — Levers for raising and lowering Shovels
F — Lever for moving Slide Guage
G H — Chain Posts
I K L — Ratchet for holding Shovels in place
M N O — Drag Bars and Shovels
P — Shaft
R — Seat
S — Braces to Drag Bars
T — Rod holding Drag Bar and Braces
U — Supports for Rod "T"
V — Chains attached to Slide Gauge David J. Sheers

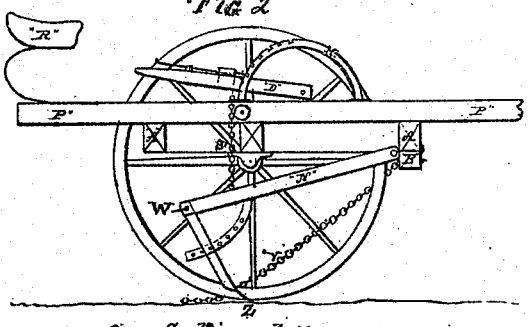

Cross Section at X

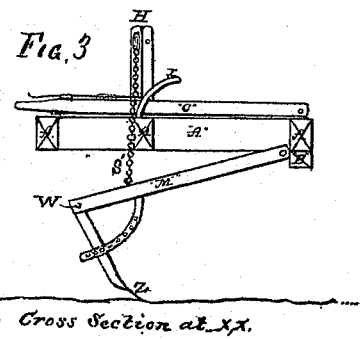

Cross Section at X X.

Witnesses:
Chas. Dunn
Wm. A. Garden

Invented Feb. 8th 1871 by
David J. Sheers

UNITED STATES PATENT OFFICE.

DAVID J. SHEERS, OF BELMONT, WISCONSIN.

IMPROVEMENT IN CORN-PLANTERS.

Specification forming part of Letters Patent No. 121,012, dated November 14, 1871; antedated November 1, 1871.

*To all whom it may concern:*

Be it known that I, DAVID J. SHEERS, of Belmont, in the county of La Fayette and State of Wisconsin, have invented certain new and useful Improvements in Corn-Markers, of which the following is a specification, reference being had to the accompanying drawing.

The invention relates to that class of corn-markers which effect the purpose of their construction by means of chains attached to the end of a sliding bar in combination therewith, and with swinging adjustable shovels, one end of each of said chains dragging on the ground in the furrow last marked, said chains and shovels, with their accompanying devices, producing the desired result of regularity of the lines traced for planting.

A in the accompanying drawing represents the frame below, and to the front bar of which is secured the drag-bar B on the rod T, so as to be capable of being slid from right to left, or vice versa, such distance as may be desired. This drag-bar is provided at each end with a chain, V, of such length as that a portion of it may rest upon the ground. To the drag-bar is connected a lever, F, pivoted to the cross-bar of the frame A, by means of which lever the drag-bar may be moved horizontally. The frame A is also provided with braces S for giving it additional strength. To the rear end of the bar P, and in such position as that the handle of the lever F can be readily reached therefrom, is attached the driver's seat R. The levers E and G, similarly constructed and provided, are hinged at their front extremities to the upper surface of the front bar of the frame A and work vertically, being so placed as that their handles are within easy reach of the driver's seat R. Each of these levers is provided with a spring-pawl having a forward pressure. The edge of the pawl fits into the curved ratchet K and serves thus to retain the lever in the desired position.

A chain, S, is secured to each of the levers E and G at or about their centers, which chain passes over the grooved pulley-wheel in the upper end of the standard H, thence depending, is secured to the swinging bar M, the rear extremity of which is provided with the shovel Z, which swings on the pivot W. The bar M has also a circular ratchet for fixing the shovel at any desired inclination. A third lever, D, is attached to the bar P, and is in all respects similar to the lever E, save that the chain which depends from it is connected directly with the swinging bar N below, there being no post H intervening.

The propelling power being attached to the device by suitable means the same may be started, the driver so directing its progress as that the chain V follows in the line of the row last marked or planted. The distance by which it is desired to separate the rows can be regulated by the lever F. The machine being in motion, should any of the shovel-markers Z, which are in contact with the ground, come in collision with any obstacle, they immediately yield to the pressure and swing backward, still bearing upon the ground; or, should the earth be soft and the machine tend to sink therein, the shovels may readily be elevated by pressing down the levers D E G. If the ground is hard a contrary movement of the said levers will bring the shovels in full bearing against it, and thus a distinct line is marked on the surface of the ground whether the same be hard or yielding.

What I claim as my invention, and desire to secure by Letters Patent, is—

The corn-marker herein shown and described, operating in the manner and for the uses and purposes as set forth.

DAVID J. SHEERS.

Witnesses:
CHARLES DUNN,
WM. A. GARDEN.

(133)